United States Patent
Schneider

(10) Patent No.: US 10,377,462 B2
(45) Date of Patent: Aug. 13, 2019

(54) DECOMPRESSION ASSEMBLY WITH AN AIR CHANNEL

(71) Applicant: Airbus Operations GmbH, Hamburg (DE)

(72) Inventor: Uwe Schneider, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 323 days.

(21) Appl. No.: 15/349,244

(22) Filed: Nov. 11, 2016

(65) Prior Publication Data
US 2017/0144745 A1    May 25, 2017

(30) Foreign Application Priority Data

Nov. 20, 2015   (EP) ..................................... 15195570
Nov. 20, 2015   (EP) ..................................... 15195571

(51) Int. Cl.
*B64C 1/14*          (2006.01)
*B64C 1/06*          (2006.01)
(Continued)

(52) U.S. Cl.
CPC ................ *B64C 1/14* (2013.01); *B64C 1/066* (2013.01); *B64C 1/18* (2013.01); *B64D 13/04* (2013.01); *B64C 2001/009* (2013.01)

(58) Field of Classification Search
CPC .. B64C 1/14; B64C 1/18; B64C 1/066; B64C 2001/009; B64D 13/04
See application file for complete search history.

(56) References Cited

U.S. PATENT DOCUMENTS

| 4,432,514 A | * | 2/1984 | Brandon | ................... B64C 1/18 |
| | | | | 137/513.3 |
| 5,118,053 A | * | 6/1992 | Singh | ....................... B64C 1/18 |
| | | | | 244/118.5 |

(Continued)

FOREIGN PATENT DOCUMENTS

| DE | 102009012015 | 9/2010 |
| DE | 102011011976 | 8/2012 |

(Continued)

OTHER PUBLICATIONS

European Search Report, dated Feb. 23, 2016, priority document EP15195570.5.

*Primary Examiner* — Valentina Xavier
(74) *Attorney, Agent, or Firm* — Greer, Burns & Crain, Ltd.

(57) ABSTRACT

A decompression assembly for use in an aircraft comprises a cabin lining element, an opening formed in the element, and an air channel arranged adjacent to a rear face of the element and connected to the opening. The air channel is provided with an air outlet which, during normal operation of the assembly, discharges air exiting a cabin region delimited by the element through the opening into an area located between the element and an aircraft outer skin, a first decompression opening, and a first decompression flap which, during normal operation of the decompression assembly, closes the first decompression opening in the air channel and which, in the event of a rapid decompression, opens the first decompression opening to allow a pressure equalization between the aircraft cabin region and the aircraft area located between the cabin lining element and the aircraft outer skin.

14 Claims, 3 Drawing Sheets

(51) Int. Cl.
*B64D 13/04* (2006.01)
*B64C 1/18* (2006.01)
*B64C 1/00* (2006.01)

(56) References Cited

U.S. PATENT DOCUMENTS

| | | | |
|---|---|---|---|
| 6,273,365 B1 * | 8/2001 | Hiesener | B64D 11/003 244/118.1 |
| 8,955,803 B2 | 2/2015 | Voss et al. | |
| 9,022,321 B2 * | 5/2015 | Vogt | B64C 1/066 244/129.4 |
| 9,440,744 B2 * | 9/2016 | Perkins | B64D 13/00 |
| 2010/0187358 A1 * | 7/2010 | Voss | B64C 1/18 244/129.4 |
| 2010/0320318 A1 * | 12/2010 | Roth | B64C 1/066 244/118.5 |
| 2012/0043421 A1 * | 2/2012 | Voss | B64C 1/18 244/118.5 |
| 2012/0214393 A1 | 8/2012 | Vogt et al. | |

FOREIGN PATENT DOCUMENTS

| | | |
|---|---|---|
| EP | 0420306 | 4/1991 |
| EP | 2403756 | 1/2012 |
| EP | 2492190 | 8/2012 |

* cited by examiner

DECOMPRESSION ASSEMBLY WITH AN AIR CHANNEL

CROSS-REFERENCES TO RELATED APPLICATIONS

This application claims the benefit of the European patent application No. 15 195 570.5 filed on Nov. 20, 2015, and of the European patent application No. 15 195 571.3 filed on Nov. 20, 2015, the entire disclosures of which are incorporated herein by way of reference.

BACKGROUND OF THE INVENTION

The invention relates to a decompression assembly for use in an aircraft, for example a passenger aircraft. Furthermore, the invention relates to an aircraft which is equipped with a decompression assembly of this kind.

Passenger aircraft currently in use comprise a pressurized cabin, the internal pressure of which, during flight operation of the aircraft, is maintained, for example by means of an air conditioning system, at a pressure level that is increased compared to the ambient pressure, i.e., the reduced atmospheric pressure at high altitudes. Generally, the pressure in the interior of the cabin of a passenger aircraft while the aircraft is flying at cruising altitude usually corresponds approximately to the atmospheric pressure at an altitude of 8000 ft. (ca. 2400 m). The conditioning air supplied by the aircraft air conditioning system is conventionally fed into the cabin through air inlet ducts, which open out into the cabin above the passenger seats in the region of ceiling lining panels and/or side lining panels of the cabin lining. The exhaust air from the cabin usually is discharged through air outlet ducts, which are disposed in the region of a cabin floor or a portion of the side lining panels that is situated near the floor. In order to avoid damage to the cabin lining, in particular to the side lining panels, in the event of a decompression, i.e., in the event of a pressure drop in a region of the aircraft cabin which is kept at an increased pressure during flight, a mutual pressure equalization between an inner region of the aircraft cabin which is delimited by the side lining panels of the cabin lining and a region of the aircraft lying between the side lining panels of the cabin lining and the aircraft outer skin must be possible.

DE 10 2009 012 015 A1, EP 2 403 756 A1 and U.S. Pat. No. 8,955,803 B2 describe a dado panel with an integrated flap mechanism which, in the event of a sudden pressure drop in an aircraft region lying between the side lining panels of the cabin lining and the aircraft outer skin, opens a pressure equalizing opening, through which air can flow out of the inner region of the aircraft cabin delimited by the side lining panels into the aircraft region between the side lining panels and the aircraft outer skin, which is affected by the decompression. In the event of a decompression in the inner region of the aircraft cabin delimited by the side lining panels, an air outlet duct which, during normal operation of the aircraft, serves to discharge exhaust air from the interior of the cabin into the region of the aircraft lying between the side lining panels and the aircraft outer skin is utilized to lead air out of the region of the aircraft lying between the side lining panels and the aircraft outer skin into the inner region of the aircraft cabin affected by the sudden pressure drop in order to allow a pressure equalization.

DE 10 2011 011 976 B4 and U.S. Pat. No. 9,022,321 B2 disclose a decompression arrangement comprising a first cabin lining element that extends, in at least some sections, substantially parallel with an aircraft outer skin and includes a lower edge region provided at a distance from a floor of the aircraft, wherein the first cabin lining element extends from the lower edge region generally upwardly in a direction of a ceiling of the aircraft. A second cabin lining element is positioned between the first cabin lining element and the aircraft outer skin, wherein the second cabin lining element includes an upper edge region positioned between the lower edge region of the first cabin lining element and the aircraft outer skin. The second cabin lining element extends downwardly from the upper edge region in a direction of the floor of the aircraft. An air discharge opening is arranged between the lower edge region of the first cabin lining element and the upper edge region of the second cabin lining element and is adapted, in the normal operation of the aircraft, to discharge air from the inner region of the cabin into a region of the aircraft lying between the first and second cabin lining elements and the aircraft outer skin.

A decompression element is integrated in the second cabin lining element and has a flap which, in a closed position, closes a pressure equalizing opening formed in the decompression element. The flap is configured to, if a first predetermined differential pressure acts on the decompression element, pivot about an axis in a first direction from the closed position into a first open position, wherein in the first open position the flap opens the pressure equalizing opening formed in the decompression element. Further, the flap is configured to, if a second predetermined differential pressure acts on the decompression element, pivot about the axis in a second direction opposite the first direction into a second open position, wherein in the second open position the flap opens the pressure equalizing opening formed in the decompression element. The decompression element is positioned relative to the first and the second cabin lining elements in such a manner that the flap in its second open position keeps clear a through-flow cross-section of the air discharge opening.

SUMMARY OF THE INVENTION

The invention is directed at the object of providing a space optimized decompression assembly. Further, the invention is directed at an object of providing an aircraft which is equipped with a decompression assembly of this kind.

A decompression assembly for use in an aircraft comprises a cabin lining element. The cabin lining element may be a decorative lining element which extends in the region of a side wall of an aircraft passenger cabin, in particular, close to a passenger cabin floor. An opening is formed in the cabin lining element. For example, the opening may be formed in a region of the cabin lining element which, when the cabin lining element is installed in an aircraft cabin, faces the cabin floor and thus is arranged in the region of a foot space of passengers sitting on passenger seats arranged in the aircraft cabin. Basically, the cabin lining element may be provided with only one opening. It is, however, also conceivable that multiple openings are formed in the cabin lining element.

The decompression assembly further comprises an air channel which is arranged adjacent to a rear face of the cabin lining element. The term "rear face" in this context designates a face of the cabin lining element which, when the cabin lining element is installed in an aircraft cabin, faces away from the interior of the aircraft cabin, i.e. faces an inner face of an aircraft outer skin. The air channel is connected to the opening formed in the cabin lining element. Thus, when the cabin lining element is installed in an aircraft cabin, the opening formed in the cabin lining element allows an air exchange between the aircraft cabin and the air channel. The air channel may extend adjacent to the rear face of the cabin lining element, i.e., when viewed from an interior of the aircraft cabin, behind the cabin lining element substantially parallel to a longitudinal axis of the aircraft cabin.

The air channel is provided with an air outlet which, during normal operation of the decompression assembly, is adapted to discharge air exiting an aircraft cabin region delimited by the cabin lining element through the opening formed in the cabin lining element into an aircraft area located between the cabin lining element and an aircraft outer skin. Thus, during normal operation of the decompression assembly, cabin exhaust air may be guided from the aircraft cabin region delimited by the cabin lining element via the opening formed in the cabin lining element, the air channel and the area outlet of the air channel into the aircraft area located between the cabin lining element and the aircraft outer skin. From the aircraft area located between the cabin lining element and the aircraft outer skin the cabin exhaust air may be directed into a mixing chamber of an aircraft air-conditioning system so as to be recirculated into aircraft cabin or may be discharged overboard, for example via an air outlet valve.

The air channel of the decompression assembly further comprises a first decompression opening. A first decompression flap is present which, during normal operation of the decompression assembly, is adapted to close the first decompression opening provided in the air channel. Thus, during normal operation of the decompression assembly, air entering the air channel via the opening provided in the cabin lining element exits the air channel exclusively via the air outlet. The first decompression flap, in the event of a rapid decompression, is adapted to open the first decompression opening so as to allow a pressure equalization between the aircraft cabin region delimited by the cabin lining element and the aircraft area located between the cabin lining element and the aircraft outer skin. Thus, in the event of a sudden pressure drop either in the aircraft cabin region delimited by the cabin lining element or in the aircraft area located between the cabin lining element and the aircraft outer skin, air may flow from the aircraft cabin region delimited by the cabin lining element into the aircraft area located between the cabin lining element and the aircraft outer skin or vice versa via the opening provided in the cabin lining element, the air channel and the first decompression opening.

In the event of a rapid decompression, the decompression assembly allows a quick and reliable pressure equalization between the aircraft cabin region delimited by the cabin lining element and the aircraft area located between the cabin lining element and the aircraft outer skin. In addition, due to the design of the decompression assembly with an air channel arranged adjacent to the rear face of the cabin lining element, the decompression assembly is particularly installation space saving. Moreover, the cabin lining element, in the region of its front face which, when the cabin lining element is installed in an aircraft cabin, faces the interior of the aircraft cabin, can be designed with a substantially flat surface without curvatures protruding into the interior of the aircraft cabin. As a result, the foot space of passengers sitting on passenger seats installed in the aircraft cabin adjacent to the cabin lining element can be increased without affecting the rapid decompression function of the decompression assembly. Finally, sensitive components of the decompression assembly such as, for example, the first decompression flap are shielded from the interior of the aircraft cabin and hence reliably protected from misuse loads, such as, for example, foot treads or the like.

In a preferred embodiment of the decompression assembly, the air outlet is formed in a first wall of the air channel. Preferably, the first wall has a first edge which faces the rear face of the cabin lining element and a second edge which faces away from the rear face of the cabin lining element. The first wall of the air channel thus may protrude from the rear face of the cabin lining element. In dependence on the installation requirements and the available installation space, the first wall of the air channel may, for example, extend at an angle of approximately 80 to 100° relative to the rear face of the cabin lining element. Specifically, the first wall of the air channel may extend substantially perpendicular from the rear face of the cabin lining element.

The opening formed in the cabin lining element may be covered by an air permeable grid. Preferably, the grid is designed in such a manner that it does not affect an air flow through the opening formed in the cabin lining element, but protects sensitive components of the decompression assembly such as, for example, the first decompression flap. For example, the grid may be made of a metal or plastic material which has a strength that is sufficient to withstand misuse loads, such as, for example, foot treads. Alternatively or additionally thereto, the air outlet formed in the air channel may be covered by an air permeable grid. The grid preferably is designed in such a manner that it does not affect the cabin exhaust air flow through the air outlet, but prevents dirt and dust particles from entering the aircraft area located between the cabin lining element and the aircraft outer skin.

The first decompression opening may be formed in a second wall of the air channel which extends at a distance from the rear face of the cabin lining element opposed to the opening formed in the cabin lining element. In dependence on the installation requirements and the available installation space, the second wall of the air channel may, for example, extend at a distance from the rear face of the cabin lining element and at an angle of approximately −10 to 10° relative to the rear face of the cabin lining element.

Preferably, the first decompression flap is pivotable about a first pivot axis. In the event of a rapid decompression, the first decompression flap may be adapted to pivot around the first pivot axis in a direction away from the rear face of the cabin lining element so as to allow an airflow from the air channel through the first decompression opening into the aircraft area located between the cabin lining element and the aircraft outer skin. Thus, in the event of a sudden pressure drop in the aircraft area located between the cabin lining element and the aircraft outer skin, air from the aircraft cabin region delimited by the cabin lining element may flow through the opening formed in the cabin lining element into the air channel and further through the first decompression opening into the aircraft area located between the cabin lining element and the aircraft outer skin. As a result, a pressure equalization between the aircraft cabin region delimited by the cabin lining element and the aircraft area located between the cabin lining element and the aircraft outer skin is made possible.

The first pivot axis of the first decompression flap may be arranged along an edge of the first decompression flap which faces the air outlet. In particular, the first pivot axis of the first decompression flap may extend along an edge of the first decompression flap which faces the second edge of the first wall of the air channel.

In a preferred embodiment of the decompression assembly, the air channel may further comprise a second decompression opening. In addition, the air channel may comprise a second decompression flap which, during normal operation of the decompression assembly, may be adapted to close the second decompression opening provided in the air channel and which, in the event of a rapid decompression, may be adapted to open the second decompression opening so as to allow a pressure equalization between the aircraft cabin region delimited by the cabin lining element and the aircraft area located between the cabin lining element and the aircraft outer skin. Thus, in the event of a sudden pressure drop either in the aircraft cabin region delimited by the cabin lining element or in the aircraft area located between the cabin lining element and the aircraft outer skin, air may flow from the aircraft cabin region delimited by the cabin lining element into the aircraft area located between the cabin lining element and the aircraft outer skin or vice versa via the opening provided in the cabin lining element, the air channel and the second decompression opening.

The second decompression opening may be formed in a third wall of the air channel which has a first edge facing the rear face of the cabin lining element and a second edge facing away from the rear face of the cabin lining element. The third wall of the air channel thus may protrude from the rear face of the cabin lining element. In dependence on the installation requirements and the available installation space, the third wall of the air channel may, for example, extend at an angle of approximately 80 to 100° relative to the rear face of the cabin lining element. Specifically, the third wall of the air channel may extend substantially perpendicular from the rear face of the cabin lining element and/or substantially parallel to the first wall of the air channel.

The second decompression flap may be pivotable about a second pivot axis. In the event of a rapid decompression, the second decompression flap may be adapted to pivot in a direction into an interior of the air channel so as to allow an airflow from the aircraft area located between the cabin lining element and the aircraft outer skin into the air channel through the second decompression opening. Thus, in the event of a sudden pressure drop in the aircraft cabin region delimited by the cabin lining element, air from the aircraft area located between the cabin lining element and the aircraft outer skin air may flow through the second decompression opening into the air channel and further through the opening formed in the cabin lining element into the aircraft cabin region delimited by the cabin lining element. As a result, a pressure equalization between the aircraft area located between the cabin lining element and the aircraft outer skin and the aircraft cabin region delimited by the cabin lining element is made possible.

The second pivot axis of the second decompression flap may be arranged along an edge of the second decompression flap which faces away from the rear face of the cabin lining element. In particular, the second pivot axis of the second decompression flap may extend along an edge of the second decompression flap which faces the second wall of the air channel.

A cross-sectional area of the first decompression opening may be larger than a cross-sectional area of the second decompression opening. Correspondingly, a surface area of the first decompression flap may be larger than a surface area of the second decompression flap. Thus, in the event of a sudden pressure drop in the aircraft area located between the cabin lining element and the aircraft outer skin, a particularly quick pressure equalization between the aircraft cabin region delimited by the cabin lining element and the aircraft area located between the cabin lining element and the aircraft outer skin may be achieved.

The first decompression flap may be biased into its closed position by means of a first biasing mechanism. Alternatively or additionally thereto, the second decompression flap may be biased into its closed position by means of a second biasing mechanism. The first and/or the second biasing mechanism may, for example, comprise a spring element or another elastic element which is suitable to apply a biasing force to the first decompression flap and/or the second decompression flap. The biasing force provided by the first and/or the second biasing mechanism may be controlled as desired by a suitable design of the biasing mechanism, for example by equipping the biasing mechanism with a spring element having a desired spring constant.

The first biasing mechanism may be adapted to bias the first decompression flap into its closed position until a pressure difference between the aircraft cabin region delimited by the cabin lining element and the aircraft area located between the cabin lining element and the aircraft outer skin exceeds a rapid decompression threshold value. Similarly, the second biasing mechanism may be adapted to bias the second decompression flap into its closed position until a pressure difference between the aircraft cabin region delimited by the cabin lining element and the aircraft area located between the cabin lining element and the aircraft outer skin exceeds a rapid decompression threshold value.

Thus, during normal operation of the decompression assembly, as long as the biasing force provided by the first and/or the second biasing mechanism exceeds a pressure difference between the aircraft cabin region delimited by the cabin lining element and the aircraft area located between the cabin lining element and the aircraft outer skin, which acts on opposing surfaces of the first and/or the second decompression flap, the first and/or the second decompression flap are held in the closed position without an additional locking mechanism or the like being necessary.

To the contrary, as soon as the pressure difference between the aircraft cabin region delimited by the cabin lining element and the aircraft area located between the cabin lining element and the aircraft outer skin, which acts on opposing surfaces of the first and/or the second decompression flap, exceeds the rapid decompression threshold value and hence the biasing force provided by the first and/or the second biasing mechanism, the first and/or the second decompression flap is/are opened against the biasing action exerted by the first and/or the second biasing mechanism so as to allow a pressure equalization between the aircraft cabin region delimited by the cabin lining element and the aircraft area located between the cabin lining element and the aircraft outer skin.

Further, the first biasing mechanism may be adapted to bias the first decompression flap, after a decompression event, into its closed position again as soon as a pressure difference between the aircraft cabin region delimited by the cabin lining element and the aircraft area located between the cabin lining element and the aircraft outer skin again is lower than the decompression threshold value. Similarly, the second biasing mechanism may be adapted to bias the second decompression flap, after a decompression event, into its closed position again as soon as a pressure difference between the aircraft cabin region delimited by the cabin lining element and the aircraft area located between the cabin lining element and the aircraft outer skin again is lower than the decompression threshold value.

Thus, after pressure equalization between the aircraft cabin region delimited by the cabin lining element and the aircraft area located between the cabin lining element and the aircraft outer skin, when the biasing force provided by the first and/or the second biasing mechanism again exceeds a pressure difference acting on opposing surfaces of the first and/or the second decompression flap, the first and/or the second decompression flap again is/are automatically closed due to the biasing force provided by the first and/or the second biasing mechanism. Manual closing of the first and/or the second decompression flap and or the provision of an automatic closing mechanism for closing of the first and/or the second decompression flap thus is not necessary. The decompression assembly thus has a particularly simple structure and maintenance free structure.

Basically, the cabin lining element of the decompression assembly may be any desired cabin lining element suitable for installation in an aircraft cabin. Preferably, however, the cabin lining elements is dado panel.

An aircraft may be equipped with an above-described decompression assembly.

BRIEF DESCRIPTION OF THE DRAWINGS

A preferred embodiment of a decompression assembly for use in an aircraft now will be described in greater detail with reference to the accompanying schematic drawings, wherein.

DETAILED DESCRIPTION OF THE PREFERRED EMBODIMENTS

Figure 1:
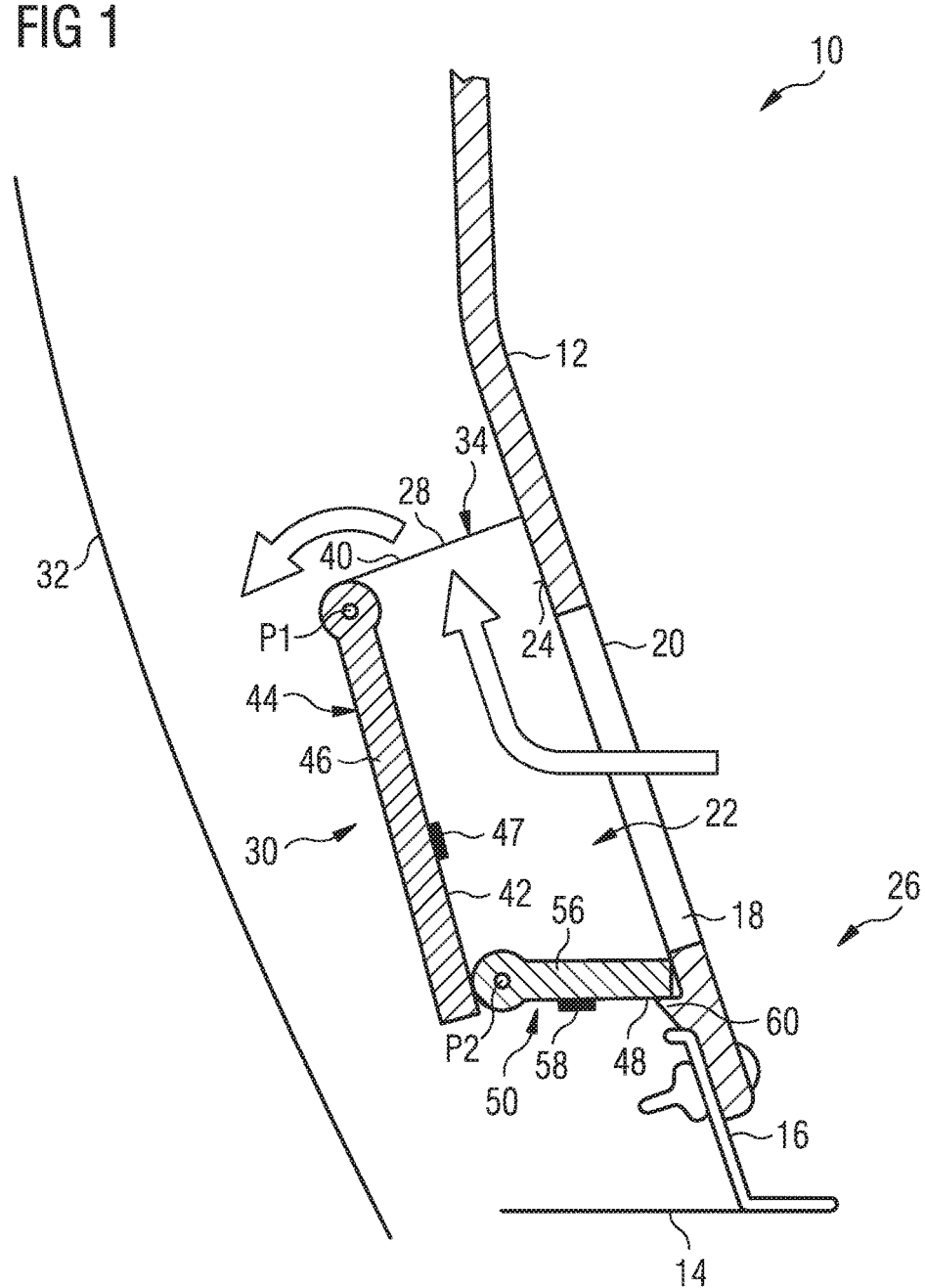
FIG. 1 shows a decompression assembly which is installed in an aircraft during normal operation of the decompression assembly.
Figure 2:
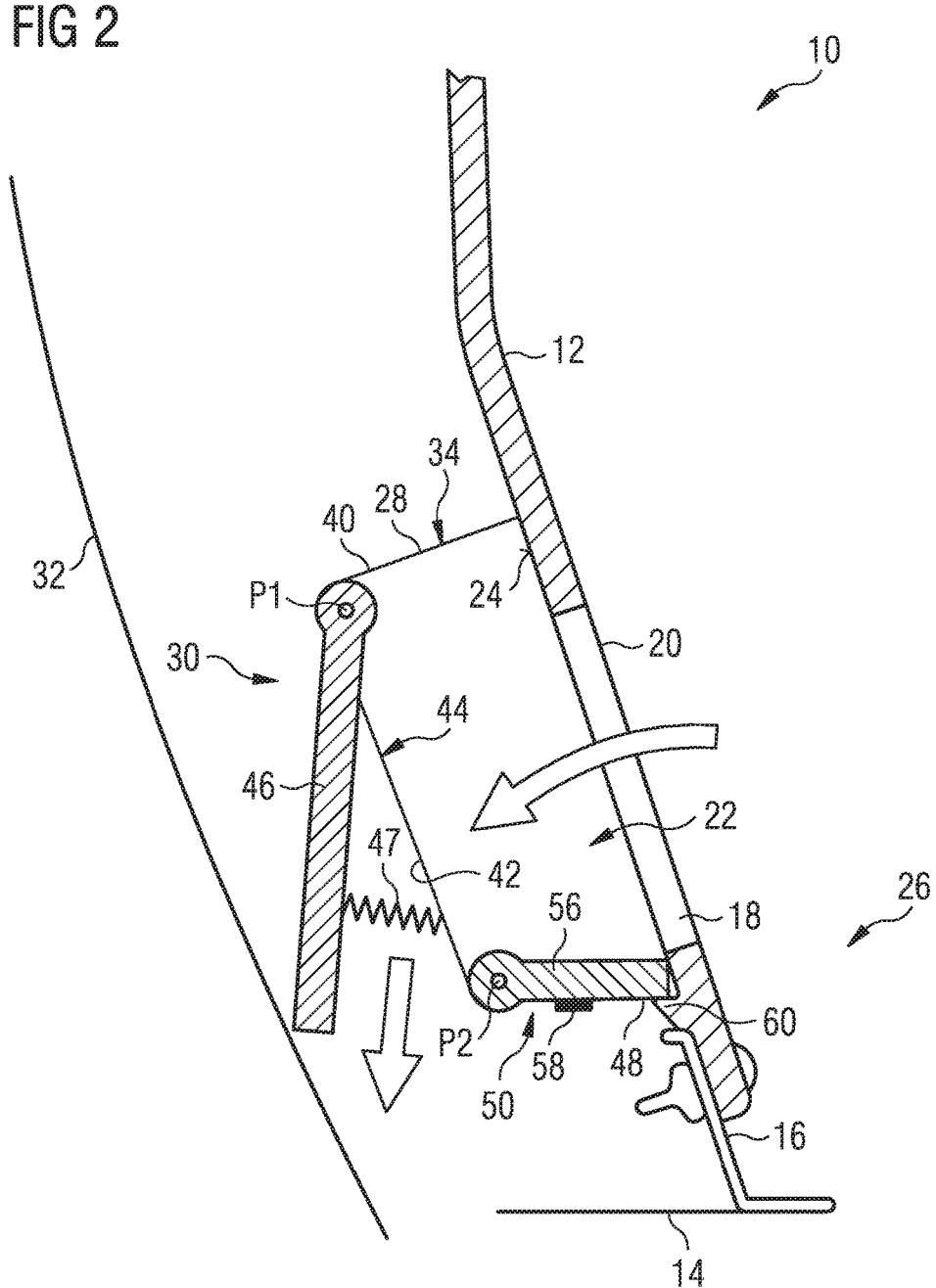
FIG. 2 shows the decompression assembly according to FIG. 1 in the event of a rapid decompression caused by a sudden pressure drop in an aircraft cabin region delimited by the cabin lining element.
Figure 3:
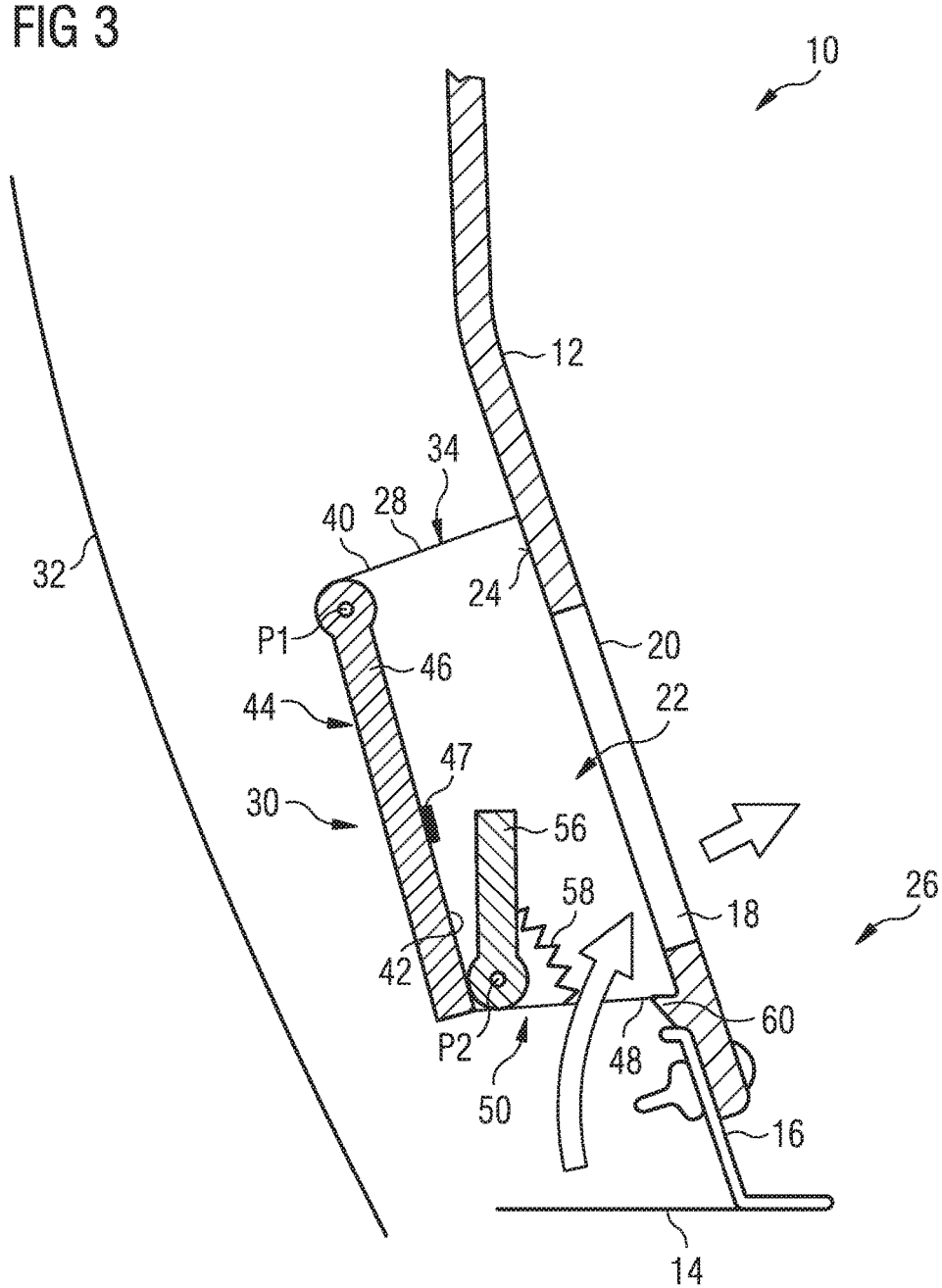
FIG. 3 shows the decompression assembly according to FIG. 1 in the event of a rapid decompression caused by a sudden pressure drop in an aircraft area located between a cabin lining element of the decompression assembly and an aircraft outer skin.

A decompression assembly 10 for use in an aircraft, in particular a passenger aircraft, is represented in FIGS. 1 to 3 and comprises a cabin lining element 12. In the embodiment of a decompression assembly 10 shown in the drawings, the cabin lining element 12 is designed in the form of a dado panel which constitutes a part of a sidewall lining of an aircraft cabin and is arranged adjacent to a cabin floor 14. A gap between a lower edge of the cabin lining element 12 and the cabin floor 14 is closed by means of a cover element 16. An opening 18 is formed in the cabin lining element 12 which is covered by means of an air permeable grid 20. The grid 20 protects components of the decompression assembly 10 which, when the decompression assembly 10 is viewed from an interior of the aircraft cabin, are arranged behind the cabin lining element 12 and which will be described in greater detail below from misuse loads, such as, for example, foot treads or the like.

In addition, the decompression assembly 10 comprises an air channel 22 which is arranged adjacent to a rear face 24 of the cabin lining element 12. When the decompression assembly 10 is installed in an aircraft cabin as shown in the drawings the rear face 24 of the cabin lining element 12 faces away from an interior of the aircraft cabin. The air channel 22 is connected to the opening 18 formed in the cabin lining element 12. Thus, the opening 18 establishes an air flow path between an aircraft cabin region 26 delimited by the cabin lining element 12 and the air channel 22.

The air channel 22 comprises an air outlet 28 which, during normal operation of the decompression assembly 10, discharges air exiting the aircraft cabin region 26 delimited by the cabin lining element 12 through the opening 18 formed in the cabin lining element 12 into an aircraft area 30 which is located between the cabin lining element 12 and an aircraft outer skin 32, see FIG. 1. Thus, during normal operation of the decompression assembly 10, cabin exhaust air is guided from the aircraft cabin region 26 delimited by the cabin lining element 12 via the opening 18, the air channel 22 and the area outlet 28 into the aircraft area 30 located between the cabin lining element 12 and the aircraft outer skin 32.

The air outlet 28 is formed in a first wall 34 of the air channel 22 which has a first edge facing the rear face 24 of the cabin lining element 12 and a second edge facing away from the rear face 24 of the cabin lining element 12. In the embodiment of a decompression assembly 10 shown in the drawings, the first wall 34 extends substantially perpendicular from the rear face 24 of the cabin lining element 12. The outlet 28 is covered by an air permeable grid 40. The grid 40 prevents dirt and dust particles from entering the aircraft area 30 located between the cabin lining element 12 and the aircraft outer skin 32.

The air channel 22 of the decompression assembly 10 further comprises a first decompression opening 42. The first decompression opening 42 is formed in a second wall 44 of the air channel 22 which extends at a distance from the rear face 24 of the cabin lining element 12 opposed to the opening 18 formed in the cabin lining element 12. In particular, the second wall 44 of the air channel 22 extends substantially parallel to a portion of the rear face 24 of the cabin lining element 12 which surrounds the opening 18.

A first decompression flap 46 is present which, during normal operation of the decompression assembly 10, closes the first decompression opening 42 provided in the air channel 22 as shown in FIG. 1. The first decompression flap 46 is pivotable about a first pivot axis P1 which extends along an edge of the first decompression flap 46 which faces the air outlet 28, in particular the second edge of the first wall 34 of the air channel 22. A first biasing mechanism 47 serves to bias the first decompression flap 46 into its closed position.

The decompression assembly 10 also comprises a second decompression opening 48 which is formed in a third wall 50 of the air channel 22. The second decompression opening 48 has a cross-sectional area which is smaller than a cross-sectional area of the first decompression opening 42. The third wall 50 of the air channel 22 has a first edge facing the rear face 24 of the cabin lining element 12 and a second edge facing away from the rear face 24 of the cabin lining element 12. In the embodiment of a decompression assembly 10 shown in the drawings, the third wall 50 of the air channel 22 extends substantially perpendicular from the rear face 24 of the cabin lining element 12 and substantially parallel to the first wall 34 of the air channel 22.

The second decompression flap 56, during normal operation of the decompression assembly 10, closes the second decompression opening 48 provided in the air channel 22, see FIG. 1. Thus, during normal operation of the decompression assembly 10, air entering the air channel 22 via the opening 18 provided in the cabin lining element 12 exits the air channel 22 exclusively via the air outlet 28. The second decompression flap 56 is pivotable about a second pivot axis P2 which extends along an edge of the second decompression flap 56 which faces away from the rear face 24 of the cabin lining element 12 and which is arranged adjacent to the second wall 44 of the air channel 22. A second biasing mechanism 48 serves to bias the second decompression flap 56 into its closed position. In its closed position, an edge of the second decompression flap 56 which faces the rear face 24 of the cabin lining element 12 abuts against an abutting element 60 which, in the embodiment of a decompression assembly 10 shown in the drawings, is formed integral with the cabin lining element 12 and protrudes from the rear face 24 of the cabin lining element 12.

In the event of a rapid decompression, the first decompression flap 46 is adapted to open the first decompression opening 42 so as to allow a pressure equalization between the aircraft cabin region 26 delimited by the cabin lining element 12 and the aircraft area 30 located between the cabin lining element 12 and the aircraft outer skin 32. Similarly, the second decompression flap 56 is adapted to open the second decompression opening 48 so as to allow a pressure equalization between the aircraft cabin region 26 delimited by the cabin lining element 12 and the aircraft area 30 located between the cabin lining element 12 and the aircraft outer skin 32.

Specifically, if in the event of a rapid decompression which is caused by a sudden pressure drop in the aircraft area 30 located between the cabin lining element 12 and the aircraft outer skin 32 a pressure difference between the aircraft area 30 located between the cabin lining element 12 and the aircraft outer skin 32 and the aircraft cabin region 26 delimited by the cabin lining element 12 exceeds a rapid decompression threshold value, the pressure difference acting on opposing side faces of the first decompression flap 46 exceeds the biasing force which is applied to the first decompression flap 46 by the first biasing mechanism 47. As a result, as shown in FIG. 2, the first decompression flap 46 pivots about the first pivot axis P1 in a direction away from the rear face 24 of the cabin lining element 12 so as to open the first decompression opening 42 and to allow an air flow from the air channel 22 through the first decompression opening 42.

Thus, air may flow from the aircraft cabin region 26 delimited by the cabin lining element 12 into the aircraft area 30 located between the cabin lining element 12 and the aircraft outer skin 32 via the opening 18 provided in the cabin lining element 12, the air channel 22 and the first decompression opening 42. Hence, a pressure equalization between the aircraft cabin region 26 delimited by the cabin lining element 12 and the aircraft area 30 located between the cabin lining element 12 and the aircraft outer skin 32 is made possible.

Contrary to the first decompression flap 46, in the event of a rapid decompression caused by a sudden pressure drop in the aircraft area 30 located between the cabin lining element 12 and the aircraft outer skin 32, the second decompression flap 56, due to the interaction of the edge of the second decompression flap 56 which faces the rear face 24 of the cabin lining element 12 with the abutting element 60 is maintained in its closed position. After the decompression event, i.e., as soon as a pressure difference between the aircraft area 30 located between the cabin lining element 12 and the aircraft outer skin 32 and the aircraft cabin region 26 delimited by the cabin lining element 12 again is lower than the decompression threshold value, the first biasing mechanism 47 biases the first decompression flap 46 in a direction towards the rear face 24 of the cabin lining element 12 back into its closed position.

If, in the event of a rapid decompression caused by a sudden pressure drop in the aircraft cabin region 26 delimited by the cabin lining element 12, a pressure difference between the aircraft cabin region 26 delimited by the cabin lining element 12 and the aircraft area 30 located between the cabin lining element 12 and the aircraft outer skin 32 exceeds a rapid decompression threshold value, the pressure difference acting on opposing side faces of the second decompression flap 56 exceeds the biasing force which is applied to the second decompression flap 56 by the second biasing mechanism 58. As a result, as shown in FIG. 3, the second decompression flap 56 pivots about the second pivot axis P2 in a direction into an interior of the air channel 22 so as to open the second decompression opening 48 and to allow an air flow from the aircraft area 30 located between the cabin lining element 12 and the aircraft outer skin 32 into the air channel 22 through the second decompression opening 48.

Thus, air may flow from the aircraft area 30 located between the cabin lining element 12 and the aircraft outer skin 32 through the second decompression opening 48 into the air channel 22 and further through the opening 18 formed in the cabin lining element 12 into the aircraft cabin region 26 delimited by the cabin lining element 12. Hence, a pressure equalization between the aircraft area 30 located between the cabin lining element 12 and the aircraft outer skin 32 and the aircraft cabin region 26 delimited by the cabin lining element 12 is made possible.

Contrary to the second decompression flap 56, in the event of a rapid decompression caused by a sudden pressure drop in the aircraft cabin region 26 delimited by the cabin lining element 12, the first decompression flap 46 is maintained in its closed position. After the decompression event, i.e., as soon as a pressure difference between the aircraft cabin region 26 delimited by the cabin lining element 12 and the aircraft area 30 located between the cabin lining element 12 and the aircraft outer skin 32 again is lower than the decompression threshold value, the second biasing mechanism 58 biases the second decompression flap 56 in a direction towards the third wall 50 of the air channel 22 back into its closed position until the edge of the second decompression flap 56 which faces the rear face 24 of the cabin lining element 12 again abuts against the abutting element 60.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A decompression assembly for use in an aircraft, the decompression assembly comprising:
    a cabin lining element,
    an opening formed in the cabin lining element, and
    an air channel arranged adjacent to a rear face of the cabin lining element and connected to the opening formed in the cabin lining element, wherein the air channel is provided with
an air outlet which, during normal operation of the decompression assembly, is adapted to discharge air exiting an aircraft cabin region delimited by the cabin lining element through the opening formed in the cabin lining element into an aircraft area located between the cabin lining element and an aircraft outer skin,
a first decompression opening, and
a first decompression flap which, during normal operation of the decompression assembly, is adapted to close the first decompression opening provided in the air channel and which, in the event of a rapid decompression, is adapted to open the first decompression opening so as to allow a pressure equalization between the aircraft cabin region delimited by the cabin lining element and the aircraft area located between the cabin lining element and the aircraft outer skin,
wherein the air channel further comprises:
a second decompression opening, and
a second decompression flap which, during normal operation of the decompression assembly, is adapted to close the second decompression opening provided in the air channel and which, in the event of a rapid decompression, is adapted to open the second decompression opening so as to allow a pressure equalization between the aircraft cabin region delimited by the cabin lining element and the aircraft area located between the cabin lining element and the aircraft outer skin.

2. The decompression assembly according to claim 1, wherein the air outlet is formed in a first wall of the air channel which has a first edge facing the rear face of the cabin lining element and a second edge facing away from the rear face of the cabin lining element.

3. The decompression assembly according to claim 1, wherein at least one of the opening formed in the cabin lining element and the air outlet formed in the air channel is covered by an air permeable grid.

4. The decompression assembly according to claim 1, wherein the first decompression opening is formed in a second wall of the air channel which extends at a distance from the rear face of the cabin lining element opposed to the opening formed in the cabin lining element.

5. The decompression assembly according to claim 1, wherein the first decompression flap is pivotable about a first pivot axis and, in the event of a rapid decompression, is adapted to pivot in a direction away from the rear face of the cabin lining element so as to allow an airflow from the air channel through the first decompression opening into the aircraft area located between the cabin lining element and the aircraft outer skin.

6. The decompression assembly according to claim 5, wherein the first pivot axis of the first decompression flap is arranged along an edge of the first decompression flap which faces the air outlet.

7. The decompression assembly according to claim 1, wherein the second decompression opening is formed in a third wall of the air channel which has a first edge facing the rear face of the cabin lining element and a second edge facing away from the rear face of the cabin lining element.

8. The decompression assembly according to claim 1, wherein the second decompression flap is pivotable about a second pivot axis and, in the event of a rapid decompression, is adapted to pivot in a direction into an interior of the air channel so as to allow an airflow from the aircraft area located between the cabin lining element and the aircraft outer skin into the air channel through the second decompression opening.

9. The decompression assembly according to claim 8, wherein the second pivot axis of the second decompression flap is arranged along an edge of the second decompression flap which faces away from the rear face of the cabin lining element.

10. The decompression assembly according to claim 1, wherein a cross-sectional area of the first decompression opening is larger than a cross-sectional area of the second decompression opening.

11. The decompression assembly according to claim 1, wherein at least one of the first decompression flap and the second decompression flap is biased into its closed position by means of a biasing mechanism.

12. The decompression assembly according to claim 11, wherein the biasing mechanism is adapted to bias the at least one of the first decompression flap and the second decompression flap into its closed position until a pressure difference between the aircraft cabin region delimited by the cabin lining element and the aircraft area located between the cabin lining element and the aircraft outer skin exceeds a rapid decompression threshold value and further is adapted to bias the at least one of the first decompression flap and the second decompression flap, after a rapid decompression event, into its closed position again as soon as a pressure difference between the aircraft cabin region delimited by the cabin lining element and the aircraft area located between the cabin lining element and the aircraft outer skin again is lower than the rapid decompression threshold value.

13. The decompression assembly according to claim 1, wherein the cabin lining element is a dado panel.

14. An aircraft comprising a decompression assembly comprising:
a cabin lining element,
an opening formed in the cabin lining element, and
an air channel arranged adjacent to a rear face of the cabin lining element and connected to the opening formed in the cabin lining element,
wherein the air channel is provided with
an air outlet which, during normal operation of the decompression assembly, is adapted to discharge air exiting an aircraft cabin region delimited by the cabin lining element through the opening formed in the cabin lining element into an aircraft area located between the cabin lining element and an aircraft outer skin,
a first decompression opening, and
a first decompression flap which, during normal operation of the decompression assembly, is adapted to close the first decompression opening provided in the air channel and which, in the event of a rapid decompression, is adapted to open the first decompression opening so as to allow a pressure equalization between the aircraft cabin region delimited by the cabin lining element and the aircraft area located between the cabin lining element and the aircraft outer skin,
wherein the air channel further comprises:
a second decompression opening, and
a second decompression flap which, during normal operation of the decompression assembly, is adapted to close the second decompression opening provided in the air channel and which, in the event of a rapid decompression, is adapted to open the second decompression opening so as to allow a pressure equalization between the aircraft cabin region delimited by the cabin lining element and the aircraft area located between the cabin lining element and the aircraft outer skin.

* * * * *